United States Patent [19]

Greene

[11] Patent Number: 5,438,865
[45] Date of Patent: Aug. 8, 1995

[54] ANGLE OF ATTACK SENSOR
[75] Inventor: Leonard M. Greene, Scarsdale, N.Y.
[73] Assignee: Safe Flight Instrument Corporation, White Plains, N.Y.
[21] Appl. No.: 167,189
[22] Filed: Dec. 16, 1993
[51] Int. Cl.6 .............................. G01C 21/00
[52] U.S. Cl. ........................ 73/180; 73/170.05
[58] Field of Search ............ 73/180, 188, 170.02

[56] References Cited

U.S. PATENT DOCUMENTS

| 3,665,760 | 5/1972 | Pitches et al. | 73/180 |
| 4,121,088 | 10/1978 | Doremus et al. | 73/188 |
| 4,468,961 | 9/1984 | Berg | 73/180 |
| 4,901,566 | 2/1990 | Boetsch et al. | 73/180 |

Primary Examiner—Richard E. Chilcot, Jr.
Assistant Examiner—Jewel V. Artis
Attorney, Agent, or Firm—Bacon & Thomas

[57] ABSTRACT

A vane-type forward fuselage mounted angle of attack sensor having an internal force relief feature is disclosed. The sensor includes a cam surface having a first portion which defines a segment of a circle, a second portion which defines a curve with a decreasing radius and a shoulder portion between the first and second portions. A cam follower and spring biasing member act as a stop to limit the angular displacement of the vane and as an override to protect the vane against breakage and to automatically return the vane to an operational position after an override.

11 Claims, 3 Drawing Sheets

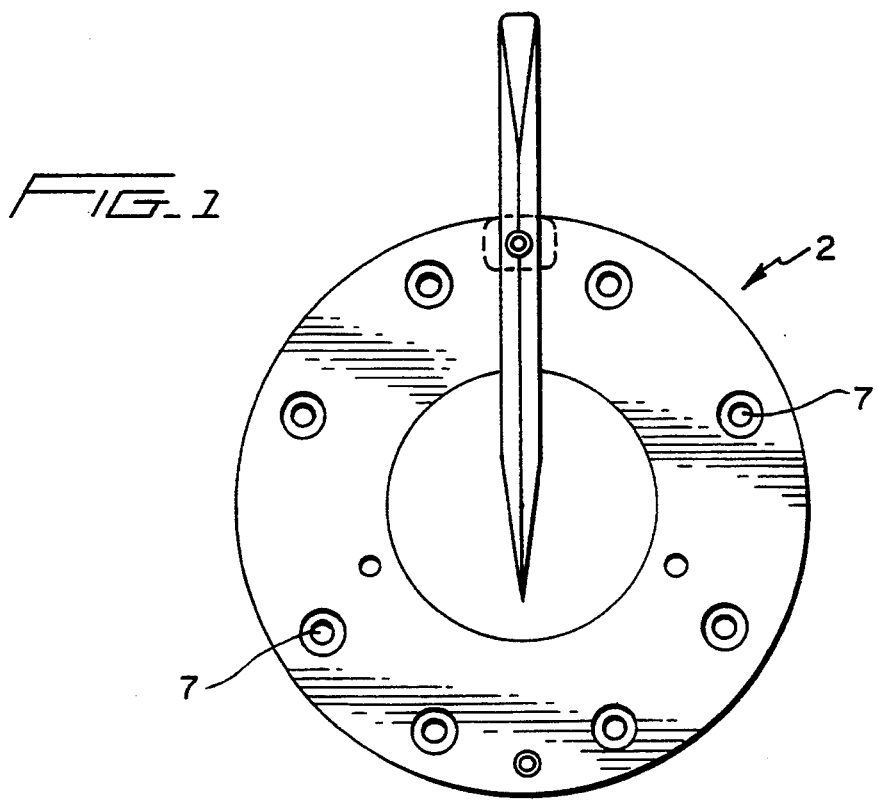
FIG_1
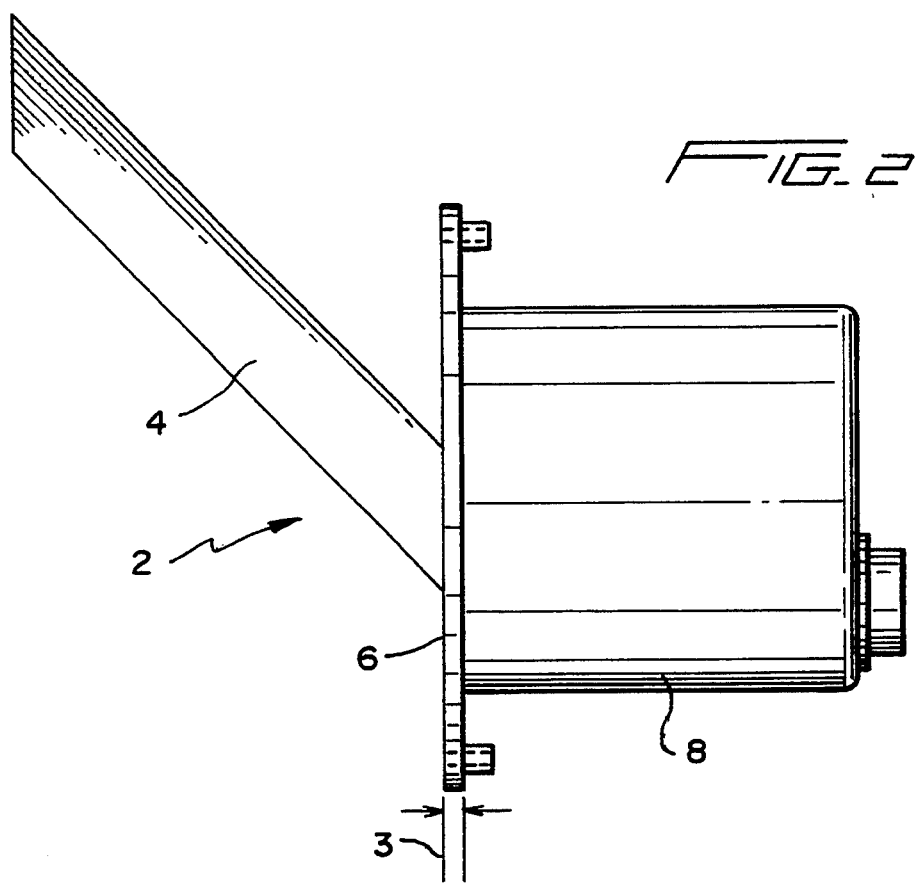
FIG_2

ANGLE OF ATTACK SENSOR

BACKGROUND OF THE INVENTION

This invention relates to an aircraft angle of attack sensor and, more particularly, to a vane-type forward fuselage mounted sensor having an internal force relief feature.

Angle of attack sensors typically include an external drag profile which is supported by a rotary shaft. The sensor is mounted on the side of the airplane fuselage and measures local airstream angle with respect to the fuselage horizontal reference plane. In one such sensor (a Safe Flight angle of attack sensor, 1703 series, manufactured by Safe Flight Instrument Corporation, White Plains, N.Y.), a small, wedge-shaped vane on the end of a movable arm senses the airflow. The arm is free to rotate through an arc of 60° and is counterbalanced so that the position of the arm is determined entirely by the airstream direction around the wedge-shaped vane. The arm pivot is attached through anti-backlash gearing to two rotary induction potentiometers (linear transformers) which generate an electrical output calibrated in terms of angle of attack. Such sensors are also equipped with anti-icing heaters.

The drag member, or vanes which are used in angle of attack sensors, protrude outwardly from the aircraft's fuselage and are therefore vulnerable to damage or breakage. Such sensors frequently include a stop mechanism to limit the rotation of the vane. If then, the vane is rotated against the stop, a relatively small force, such as a stream of water used in washing the aircraft, may be sufficient to damage the vane. In other cases, service personnel may attempt to use the vanes as a hand hold or foot rest and damage the sensor.

Eliminating the rotational stops would permit full rotation of the vane and thus reduce the likelihood of damaging the vane during the servicing of the aircraft. However, permitting full rotation of the vane would permit rotation between 90° to 180° and, if the vane were left in that position, would cause erroneous signals.

Accordingly, it is now believed that there is a significant market for an improved angle of attack sensor which incorporates an internal force relief feature and a mechanism for automatically returning the vane to its operative position after activation of the force relief feature. The improved angle of attack sensor should also be less susceptible to damage on the ground when compared to most vane-type angle of attack sensors, include electrical anti-icing elements, permit vane replacement from outside the aircraft without removing or recalibrating the sensor and resist vane breakage which might result in the broken vane being ingested by an engine. The improved angle of attack sensors must also be reliable in operation and produced at a competitive price.

It has now been found that an improved angle of attack sensor in accordance with the present invention has the aforementioned characteristics.

SUMMARY OF THE INVENTION

In essence, an angle of attack sensor in accordance with the present invention includes a rotatable vane which is positioned in response to a fluid stream or airstream across the vane and means for generating a signals which indicates the position of the vane with respect to the fuselage horizontal reference plane. The sensor also includes limit means for limiting the rotation of the vane to a predetermined angle and means for overriding the limit means so that the vane may be rotated beyond the predetermined angle when a force against the vane exceeds a predetermined level. In addition, the sensor includes means for automatically returning the vane to a position in which the predetermined angle is not exceeded.

The invention will now be described in connection with the accompanying drawings wherein like reference numerals have been used to designate like parts.

BRIEF DESCRIPTION OF THE DRAWINGS

FIG. 1 is a side-elevational view of an angle of attack sensor according to the invention;

FIG. 2 is a plan view of the angle of attack sensor shown in FIG. 1;

DESCRIPTION OF THE PREFERRED EMBODIMENTS OF THE INVENTION

Figure 3:
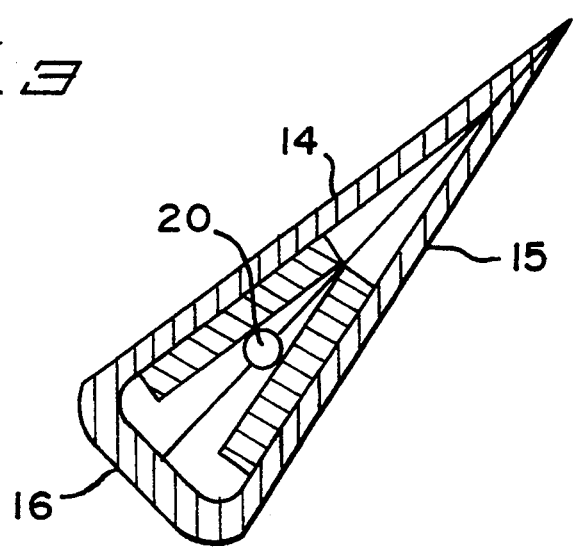
FIG. 3 is a cross-sectional view taken along the line 3—3 in FIG. 3.

Referring now to FIGS. 1 and 2, an angle of attack sensor 2 includes an external drag member or vane 4 which extends outwardly from the fuselage 3 of an airplane (not shown). The sensor 2 also includes a face plate 6 which is flush with the surface of fuselage 3 and an internal housing 8 which extends into the interior of the airplane. As illustrated in FIG. 1, the face plate 6 includes a plurality of counter sunk holes 7 for attaching the sensor 2 to the airplane.

As illustrated in FIG. 2, the vane 4 preferably has a swept bag design. It is presently believed that this configuration reduces breakage of the vane by minimizing damage from bird impacts or the like. It is also believed that the swept back design of the vane will discourage service personnel from using the vane as a handhold or foot rest and also presents a more pleasing appearance to the passengers.

In cross-section, the vane 4 preferably has a wedge shape as shown in FIG. 3 with a narrow or knife-like leading edge. For example, in a preferred embodiment of the invention, the internal angle formed at the leading edge of vane 4 by the upper surface 14 and lower surface 15 is about 21°.

The vane 4 also includes a trailing edge 16 which forms a metallic hinge in the event of a break in the forward part of the vane due to striking a bird or other object during flight. The hinge trailing edge 16 allows the vane to fold back but remain intact to prevent the vane from being ingested by an engine. In addition, a plurality of heating elements 17 and 18 (shown in FIG. 5) are disposed along the length of vane 4. Each of the heating elements 17 and 18 is in contact with an interior surface of either the upper or lower surfaces 14 and 15 (FIG. 3) and are connected to an electrical conductor 20 for de-icing the vane 4.

One important feature of the present invention relates to the means for limiting the rotation of the vane 2 to a predetermined angle in either direction, means for overriding the limiting means and the means for returning the vane to an operative position. As shown in FIG. 3, the mechanism to limit the rotation of the vane 4 includes a cam surface 30, a cam follower such as a roller 32 and a spring biasing member 34 which are disposed within the housing 8 of sensor 2. The spring biasing member 34 is fixed to a shaft 36 which is also fixed to the vane 4 and rotates in response to the rotation of vane 4. The spring biasing member 34 and roller 32 are shown in various positions a, b, c, d and e with respect to the cam surface 30 for purposes of illustration.

Figure 4:
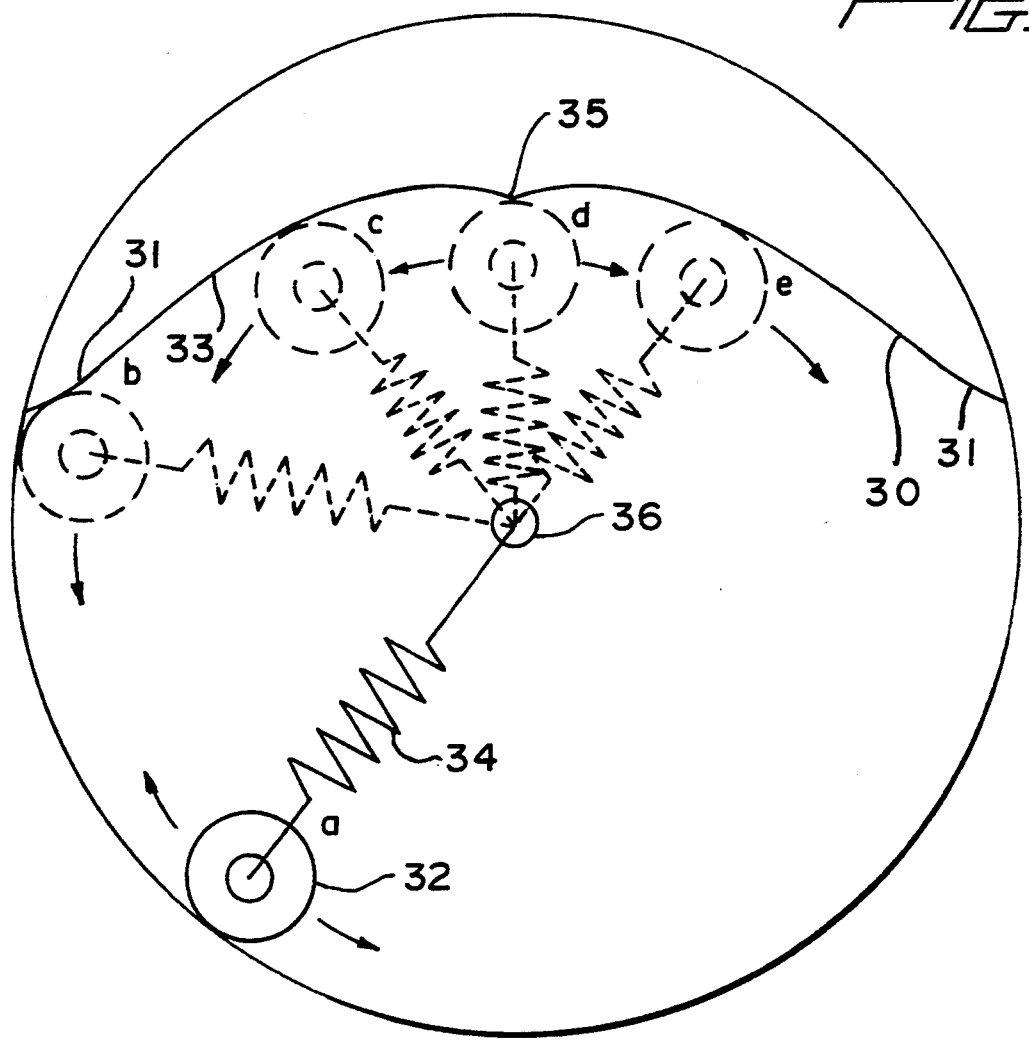
FIG. 4 is a schematic illustration of the mechanism for limiting the rotation of the vane shown in FIGS. 1 through 3, for overriding the limitation and for returning the vane to an operative position.

As illustrated in FIG. 4, the shaft 36 is free to rotate within a preselected angular range of, for example, ±100° since the lower portion of the cam surface 30 forms a segment of a circle. Since that portion has a constant radius, rotation within the preselected range will not require a force to compress the spring biasing member 34. However, when roller 32 engages a shoulder 31 as shown at position b, a considerable force will be required to compress the spring biasing member 34 in order to rotate the shaft 36 beyond the 100°. For this reason, the shoulder 31 acts as a stop while the spring biasing member provides the means for overriding the stop or limit.

As the spring biasing member 34 moves beyond shoulder 31, the radius of curvature decreases so that the force required to further compress the spring biasing member 34 increases. Thus, the potential energy is stored and will return the spring biasing member 34 and vane 4 to their operative position, i.e., within the preselected range of angular movement. The cam surface 30 also includes an apex 35 at point d where the spring biasing member 34 is fully compressed. At this point, the spring biasing member 34 is in an unstable condition and may move in either direction, i.e., toward position c or position e.

Figure 5:
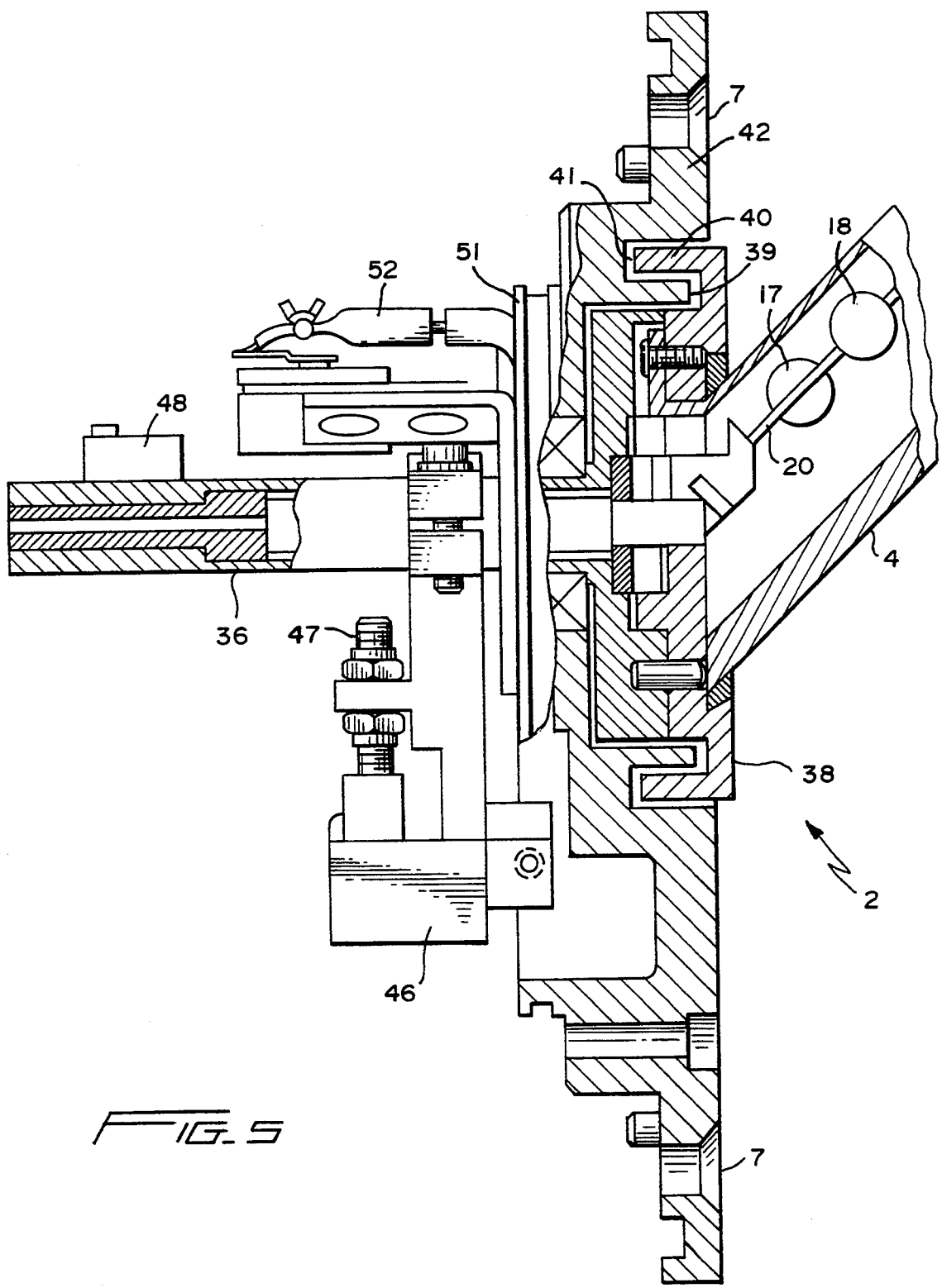
FIG. 5 is a cross-sectional view of a portion of the angle of attack sensor shown in FIG. 1.

As shown in FIG. 5, the vane 4 is mounted on shaft 36 together with a sealing ring 38. The sealing ring 38 includes a circumferential channel 39 and side wall or rim 40. The side wall or rim 40 fits within a mating channel 41 in a mounting assembly 42 to form a seal against water entering sensor 2. The mounting assembly 42 includes a plurality of countersunk holes 7 for mounting assembly 42 in the airplane.

A counterweight 46 is also fixed to shaft 36 so that the rotatable assembly including vane 4 can be balanced by means of an adjusting screw 47. Because each vane is individually balanced, the vanes are interchangeable and can be replaced without removing or recalibrating the sensor.

The sensor 2 also includes means such as a conventional induction potentiometer or resolver for producing an electrical signal which is indicative of or represents the position of shaft 36. Such means shown as a box 48 are of conventional design and are well known by those skilled in the art of manufacturing angle of attack systems. In addition, the sensor 2 may include a secondary heater 51 and electrical contact 52 for de-icing the unit and, more particularly, for preventing any moisture which might penetrate the sealing ring 38 from freezing.

While the invention has been described in connection with one of its preferred embodiments, it should be understood that changes and modifications may be made without departing from the scope of the appended claims.

What is claimed is:

1. An angle of attack sensor for an aircraft comprising a rotatable vane which is positioned in response to an airflow across said vane and means for generating a signal which indicates the position of said vane, limit means for limiting the rotation of said vane to a predetermined angle, means for overriding said limit means so that said vane may be rotated beyond the predetermined angle when a force against said vane exceeds a predetermined level and means for returning said vane from a position which exceeds the predetermined angle to a position in which the predetermined angle is not exceeded.

2. An angle of attack sensor for an aircraft according to claim 1 in which said limit means limits the rotation of said vane to a predetermined angle in either direction.

3. An angle of attack sensor for an aircraft according to claim 2 in which said means for returning said vane to a position in which the predetermined angle is not exceeded is automatic or self-activating.

4. An angle of attack sensor for an aircraft according to claim 3 in which said rotatable vane has a swept back design with a triangular cross section.

5. An angle of attack sensor for an aircraft according to claim 4 in which said vane includes a forward surface which is designed to break away at its leading edge upon impact with a flying object and a rear surface or hinge which prevents the vane from breaking away from the aircraft.

6. An angle of attack sensor for an aircraft according to claim 3 in which said vane includes an integral heater for de-icing.

7. An angle of attack sensor for an aircraft according to claim 2 which includes a counterweight assembly for balancing said vane.

8. In a device for measuring the angle of attack of an aircraft of the type having a drag member or vane responsive to the direction of the fluid stream adjacent an outer surface of the aircraft, a shaft operatively connected to said drag member or vane and adapted to rotate in response to movements of said drag member or vane, bearing means carried by said aircraft and adapted to support said shaft for rotating movement, and means responsive to the position of said shaft for generating a signal which represents the angle of attack of the aircraft, the improvement comprising means for limiting the rotation of said shaft in either direction within predetermined angler limits, means for overriding said limiting means so that said shaft may be rotated through 360° when a force against said drag member or vane exceeds a predetermined level and means for returning said drag member or vane from a position which exceeds the predetermined angular limits to a position within said predetermined angular limits when the forces on said drag member are less than the predetermined level.

9. In a device for measuring the angle of attack of an aircraft in accordance with claim 8, the improvement further comprising means defining a cam surface and having a shoulder portion and a spring biased member for engaging said shoulder portion to thereby limit the rotation of said vane to a predetermined angular displacement.

10. In a device for measuring the angle of attack of an aircraft in accordance with claim 9 in which said cam surface defines a first portion having the shape of a segment of a circle, a second portion which defines a curve with a decreasing radii and a shoulder portion separating said first and second portions and acting as a stop to limit the rotation of said vane.

11. An angle of attack sensor for an aircraft comprising a rotatable vane which is positioned in response to an airflow across said vane and means for generating a signal which indicates the position of said vane, limit means including a cam surface having a shoulder portion and a spring biased member for engaging said shoulder portion to thereby limit the rotation of said vane to a predetermined angle and means including said spring biased member for overriding said limit means so that said vane may be rotated beyond the predetermined angle when a force against said vane exceeds a predetermined level and means for automatically returning said vane from a position which exceeds the predetermined angle to a position in which the predetermined angle is not exceeded.

* * * * *